United States Patent [19]

Ching, Jr. et al.

[11] 3,964,934

[45] June 22, 1976

[54] HIGH DISCHARGE CAPABILITY SEALED THROUGH CONNECTOR

[75] Inventors: Larry K. W. Ching, Jr., Littleton; Charles E. Coleman, Lakewood, both of Colo.

[73] Assignee: The Gates Rubber Company, Denver, Colo.

[22] Filed: May 15, 1975

[21] Appl. No.: 577,813

[52] U.S. Cl. .............................. 136/135 R; 136/168
[51] Int. Cl.² ........................................... H01M 2/30
[58] Field of Search .......................... 136/168, 135 R

[56] References Cited
UNITED STATES PATENTS

| | | | |
|---|---|---|---|
| 1,376,932 | 5/1921 | Galloway | 136/168 |
| 1,519,867 | 12/1924 | Marko | 136/168 |
| 2,512,080 | 6/1950 | Wilson | 136/168 |
| 3,704,173 | 11/1972 | McClelland et al. | 136/135 R |
| 3,839,093 | 10/1974 | Twogood et al. | 136/135 R |

Primary Examiner—Donald L. Walton
Attorney, Agent, or Firm—Curtis L. Castleman, Jr.; Raymond Fink; H. W. Oberg, Jr.

[57] ABSTRACT

A through-the-partition connector particularly for lead-acid cells or batteries is disclosed in which a stud insert of relatively low electrical resistivity is embedded within a deformable lead shroud post which is tightly seated within the partition. In one aspect, the lead shroud and the partition seat are configured with inclined ramp portions, e.g., frustroconical in shape, and an interference fit is formed therebetween for an improved seal. In another aspect, the stud has a lower leg or other extension projecting therefrom, and which is fully encased by the lead shroud, particularly for increasing the current carrying capability of the connector.

23 Claims, 3 Drawing Figures

HIGH DICHARGE CAPABILITY SEALED THROUGH CONNECTOR

BACKGROUND OF THE INVENTION

This invention relates to electrolytic devices, such as conventional electrochemical cells and batteries, and particularly to a sealed through-the-partition connector for conducting electrical current therethrough.

In certain respects, the sealed connection of this invention bears resemblance to the subject matter of U.S. Pat. No. 3,839,093, issued to Twogood et al. In that patent, the sealed connection comprises a resilient seat member (e.g., of plastic) with through bores housing a soft deformable precast lead or lead alloy connector in which is embedded a connector post preferably of greater hardness than the soft lead. Means are provided for deforming the soft lead upwardly and radially against the plastic seat to provide a liquid tight seal. The connector of this patent is generally capable of conducting currents in the range of about 100–700 amperes, although the upper limit for practical current drains for appreciable discharge periods is usually limited to 400–500 amps (at approximately the 20C rate).

Certain cranking applications, such as for diesel or aircraft starting, may require significantly higher discharge currents than 500 amps. For instance, some engine starts may require 800 amps or more. While the aforementioned connector of the U.S. Pat. No. 3,839,093 patent has been found to be quite adequate to handle current drains for many applications, the connector has provided deficient for the extremely high discharge applications; at these high discharge rates high power (heat) loss occurs and in some instances the lead post has melted even to the extent of producing an open circuit.

It is a primary object of this invention to provide a sealed through post connector of minimized cross section which will sustain extremely high discharge rates. In another aspect, it is an object to provide a through-the-partition connector which so intimately conforms to the resilient partition seat that virtually no acid electrolyte can possibly escape.

SUMMARY OF THE INVENTION

Briefly described, in one aspect the sealed through connector includes a connector post insert positioned within a similarly configured seat of an electrically nonconductive resilient partition and having a through bore. Internal aspects of the seat define a shoulder portion interposed between a reduced neck portion and an inclined ramp portion. The connector post insert comprises a stud of electrically conductive material, at least the portion of the stud opposite the ramp portion of the seat being encased by a deformable lead or lead alloy shroud of higher electrical resistivity than the stud. Prior to engagement of the connector, the shroud has an outer dimension which is greater than the inner dimension of the seat so that upon subsequent engagement an interference fit is formed between the inclined surface of the shroud and the inclined ramp portion of the seat to form a liquid tight seal.

In another aspect, the above-defined connector is employed, however, the surface portion of the lead shroud and the internal surfaces of the seat need not be inclined. In this embodiment, in addition to the stud having an upper portion extending through the bore and outside the partition, and a body portion connected to this upper portion and housed within the seat, there is also provided extension means, such as a leg, protruding from the body portion, both the body portion and extension portions encased within the lead shroud to provide a very low impedance connector capable of withstanding extremely high discharge currents for limited periods of time.

The sealed through connector of the invention may be employed in various electrolytic devices for conveying current across an electrically nonconductive partition where a liquid tight seal is required. The invention has particular benefit in electrochemical cells and batteries as an electrode-to-terminal connector, or alternatively as an inter-cell connector between partitioned cells of a battery, particularly where a compact, relatively light weight connector is desirable. The following detailed description will primarily emphasize the electrode-to-terminal connection in a cylindrical sealed lead-acid electrochemical cell, without intending to limit the scope of the invention to such embodiment.

BRIEF DESCRIPTION OF THE DRAWINGS

The invention will be illustrated in a preferred embodiment thereof by reference to the accompanying drawings, wherein like numerals designate like parts, and in which.

PREFERRED EMBODIMENT OF THE INVENTION

Figure 1:
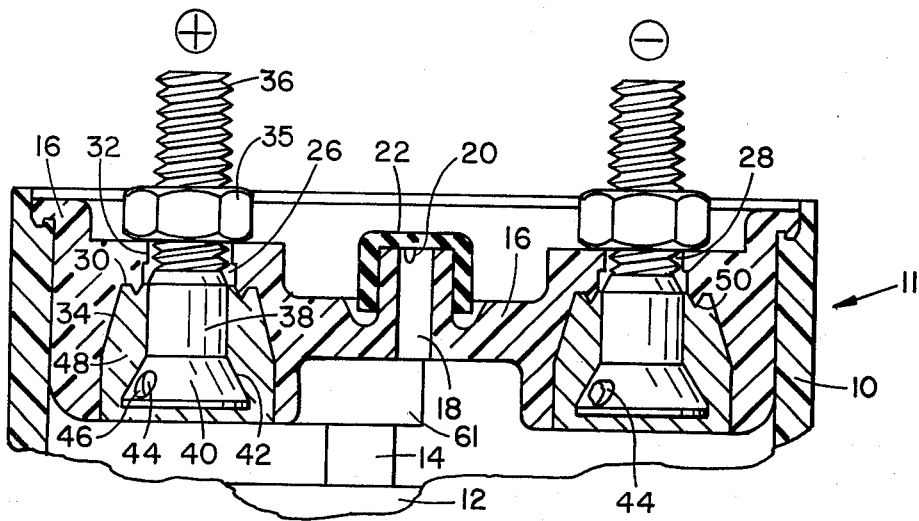
FIG. 1 is a partial sectional view of the top portion of a sealed cell depicting the through-the-partition connector of the invention in relation to other portions of the cell, and as viewed along section 1—1 of FIG. 2, inverted.

Referring to the drawings, the upper portion of a sealed maintenance-free lead-acid cell or battery 11 is shown having a cylindrical plastic container 10 made of polyphenylene oxide or ABS, for instance, to which is securely affixed or bonded an injected molded plastic top 16, forming the electrically nonconductive partition through which the sealed connection must be brought. The plastic partition 16 may desirably be provided with a central vent or port 18 and notch 20 for release of any excessive gas pressure which may develop during abnormal use of the cell. A rubber safety relief valve 22 tightly fits over the central vent. The valve may be set to release pressure in excess of 40–60 psig, for instance, and the valve will automatically re-seal upon relief of the excess pressure.

The partition 16 contains a pair of through bores 26, 28 (having vertical axes) for receipt of the connector posts forming each of the positive and negative terminal connections, respectively. The through bore defines a connector seat, the seat defined by a laterally extending annular shoulder or overhang portion 30 interposed between a reduced neck portion 32 and an inclined ramp portion 34 which in this embodiment is (inverted) frustro-conical. The angle of inclination of the ramp with respect to the axes of the bore (vertical) is preferably at least about 5°, more preferably from about 8° to about 20°.

The connector post insert generally comprises a stud having preferably an upper threaded male portion 36 which is adapted to extend upwardly through the bore 26 and exterior of the partition 16, and a body portion 38 adapted to be disposed opposite the inclined ramp 34 and which body portion also includes a head 40 having a shoulder 42.

According to one aspect of the invention, an extension or leg 44 projects away (preferably approximately laterally) from the body of the stud and may be connected to the body in various ways, such as by force fitting the leg into aperture 46 formed in the head 40 of the stud body. Alternatively, the leg 44 could be welded or brazed to the undersurface of the head 40 of the stud body, or could be a one-piece construction integrally formed with the stud such as by casting or machining.

Figure 3:
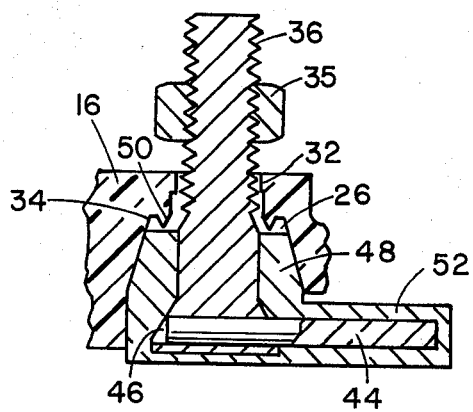
FIG. 3 is a fragmentary partial sectional view prior to full engagement of the connector in its seat, taken along section 3—3 of FIG. 2, inverted.

The remainder of the insert is formed by lead shroud 48. According to one aspect of the invention as shown in FIG. 3, prior to torquing down lock nut 35 for engagement with the threaded stud insert, the outer dimension of the shroud 48 is somewhat larger than the inner dimension provided by the seat within the partition 16. Specifically, the diameter of the inverted frustro-conical outer surface of the shroud is greater (by at least about 1 percent) than the diameter of the mating frusto-conical inner surface of the seat prior to engagement as measured along any corresponding intersecting horizontal plane. In other words, the inclined portions of the seat and shroud are preferably formed of slightly different frustrum segments of the same cone. In effect, upon tightening nut 35 the pre-cast lead in the shroud 48 deforms and cold flows (and the resilient seat 16 will also displace to some extent due to its resiliency) so that the materials will intimately flow together along the inclined interface therebetween to form an interference fit of firm mutual compression.

Further sealing capability is provided by optional embossment 50, of an annular configuration, which, upon tightening of nut 35, cause the lead in shroud 48 to flow around the surface of the embossment 50 and thereby cause the oxide layer normally present on the surface of the lead to diffuse and thereby cause a discontinuity in the oxide layer. This discontinuity is advantageous, as is well known, since acid electrolyte is much less apt to penetrate the interface formed between the lead shroud and the seat where elemental lead is present since it is not subject to attack by the electrolyte as in the case of lead oxide.

The shroud 48 also includes an extension covering portion 52 which completely covers and embeds the leg 44 to form lug 61, and provides a covering or coating which is of sufficient thickness to permit welding of the lug to electrode tab 14, connected electrically to positive plate 12.

As previously discussed, formation of the liquid tight seal is facilitated by the nut 35, which when tightened, produces an axial upward force on the stud which by virtue of the inclined shoulders 42 causes the relatively softer lead of the shroud 48 to flow axially upwardly and radially outwardly and form the compression fit with the seat of the partition 16. Other means for pressing the shroud against the resilient seat are useful, although it is preferred that the means for facilitating such pressing action be actuatable solely from outside the partition so that a "blind" connection can be made, if desired. For instance, alternatively the stud could be provided with a non-threaded upper portion which extends outside the partition and is engaged by a spring clip, for instance, a tinnerman clip, which maintains a continual biasing force tending to press the shroud against its associated seat.

The material employed for the stud, e.g., brass or copper, has a greater hardness than the deformable lead body shroud. The frusto-conical shroud portion 48 is preferably made of a high purity lead or lead alloy, preferably of a purity of at least about 99.9 weight percent, and more preferably at least about 99.99 weight percent of lead based on the total metal content of the deformable shroud. However, lower purity alloys of lead are useful in the invention if the alloy is relatively soft compared to the stud. By relatively soft is meant that the alloy under conditions of use preferably has a Brinell hardness (10 mm./31.2 kg-120 sec) of preferably less than about 10 kg/mm$^2$, or more preferably less than about 8 kg/mm$^2$. For instance, various lead-calcium alloys, e.g., containing 0.07 weight percent or less calcium, and lead-tin alloys containing preferably less than about 10 weight percent tin are generally sufficient deformable for the purposes of the invention.

Since the seal of the invention is between the deformable lead body and the resilient seat portion of partition 16, it is important that the resilient member be of sufficient rigidity to deform the lead upon its displacement and expansion against the seat of the resilient member. The seat should also have some degree of resiliency to bias the deformable lead post in a mutually pressure exerting relation. If the material lacks sufficient resiliency, it may tend to creep under constant loading, and while a certain amount of creeping or cold flow is tolerable, excessive creeping breaks the seal. In general, the resilient member should be compatible with the electrolyte of the cell and may be a machine, molded or otherwise fabricated material. Preferred materials include certain polymeric materials, particularly plastics and rubbers, including those listed in the aforementioned U.S. Pat. No. 3,839.093. At present, polypropylene, ABS and polyphenylene oxide are most preferred for lead-acid cells.

According to the invention, the improved current carrying capability of the connector is due largely to the provision of the extension or leg 44 attached to the axially disposed stud. In the embodiment illustrated, the extension means is in the configuration of a sidewardly bent leg in each connector post (see FIG. 2) which when coated with or cast within lead shroud extension 52 provides a pair of generally parallel extending lugs 61, 63. Electrode collector tab(s) 14 for the positive plate may then be welded to either side of lug 61 (shown on one side only in FIG. 1), and the corresponding collector tabs affixed to the negative plate (not shown) will be attached to lug 63 to provide connection to the negative terminal post. In general, the extension or leg 44 may be in any desired configuration as long as it projects away from the main body of the stud, is fully encased or embedded within a lead shroud, and positioned so that connections can be made between the lugs and respective electrodes. The extension means may alternatively be in the form of a disc, grid, bus bar or plate, or a plurality of extending legs or fingers, for instance, rather than a single leg as illustrated.

Preferred materials for the extension means are those which have a resistivity less than the lead of the shroud 48, preferably less than about ½ the resistivity of the lead of the shroud, and more preferably less than about one-fifth the resistivity of the shroud. Whereas pure lead normally has a resistivity of about $21.9 \times 10^{-6}$ ohm-cm, preferred extension materials include brass, copper, silver and nickel which have, respectively, resistivities (ohm-cm $\times 10^{-6}$) of about 3.9, 1.72, 1.62, and 6.9. Although less preferred, certain steel alloys have resistivities well below that of lead and can be utilized.

Both the insert stud and leg extension should preferably "wet" or metallurgically bond to the lead shroud. For this reason, insert materials such as copper or steel should preferably be provided with a tin coat, for instance, to facilitate formation of a chemical or diffusion bond with the lead shroud. The coating which is provided for the stud and leg in general should be uniform, and mutually miscible and mobile with respect to the soft lead with which it is in intimate contact. Since the coating tends to diffuse into the contiguous soft lead, a type of cold weld or alloy is produced which greatly increases the adhesive forces between the materials and permits the use of added torque when engaging the nut 35 with the threaded portion of the stud 36. The choice of the coating should be dependent upon the material being used for the stud and leg, with tin and solder being generally preferred materials for use with brass and copper studs.

Figure 2:
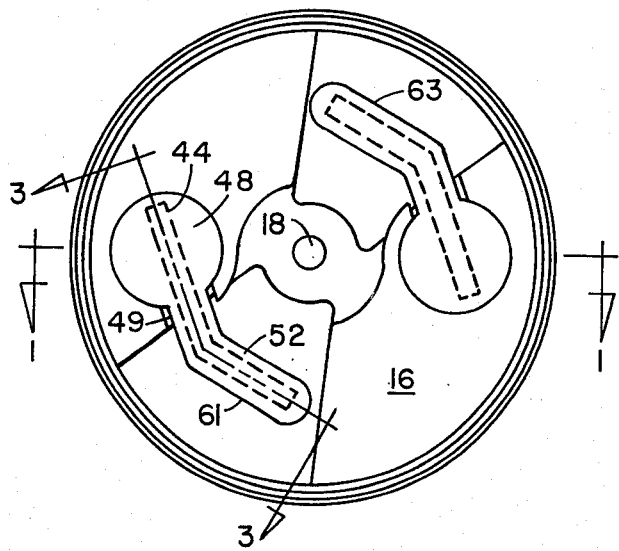
FIG. 2 is a plan view of the underneath of the top partition of the cell showing the positive and negative post connectors, and omitting, for clarity, the cell container 10, electrode plate 12 and electrode tab 14 shown in FIG. 1.

Without the use of the extending leg 44 in the connector post, tests have shown that high current drains will oftentimes cause the lead of lugs 61 and 63 to melt, particularly where the lug joins the base of the shroud, shown as area 49 of the positive post in FIG. 2. However, by including the low resistivity leg insert (employing the same overall connector post dimensions) no such melting phenomenon occurs even above 1000 amps, and this is primarily the result of the overall decrease in electrical resistivity of the lug 61. In addition to the foregoing, however, it has been found unexpectedly that the inclusion of the leg 44 during the shroud casting process actually reduces the porosity of the lead which is cast about the leg below its normal cast porosity (by itself), and in this manner further increases the conductivity of the lead layer 52 in the lug 61. It is not perfectly understood why the presence of the leg during pre-casting will reduce the porosity of the lead which is cast around it, although it is theorized that the leg tends to increase the surface area of the lead cast in contact with the leg, which contact area inherently has a reduced porosity over the interior portions of the cast. The overall result is a reduced resistivity (and hence reduced resistance along any cross sectional area of the lug) which results in lower heat build-up and reduced power loss. Inasmuch as it is known that resistance of an electrically conductive material will rise exponentially with rising temperature, and moreover since power loss is directly proportional to the resistance of the conducting medium, by suppression of heat build-up in the lug there is a concomitant dramatic increase in current carrying capability of the same size lug having the insert of the invention.

The connector post of the subject invention, also utilizing the tapered seals, have carried currents in excess of 1000 amperes and in general have shown impedances of from about one-half to about one-tenth those of the same post without the leg extension insert. Without the leg, discharge rates have generally been limited to 400–500 amperes.

It should be understood that the invention is capable of a variety of modifications and variations which will be made apparent to those skilled in the art by a reading of the specification, and which are intended to be encompassed within the spirit of the claims appended hereto. For instance, while the invention has been described particularly with relation to connections made between an electrode and a terminal of an electrochemical cell, the invention broadly covers through-the-partition electrical connections of electrolytic devices in which a sealed connection is required. Moreover, while the seal provided between the partition wall and lead post requires no additional sealing substance, such as an interposed layer of cement or tar, or an O-ring, these sealing means could normally be additionally employed without adversely affecting the resultant seal.

What is claimed is:

1. A sealed through connector for conducting electrical current from an electrolytic device through a substantially electrically nonconductive resilient partition, comprising:
    at least one connector seat having a through bore and contained within said resilient partition, the seat comprising a shoulder portion interposed between a reduced neck portion and an inclined ramp portion;
    a connector post insert positioned within the seat and extending through the bore, the insert comprising a stud of electrically conductive material and a deformable lead or lead alloy shroud having an inclined surface portion for disposition within the seat, at least the portion of the stud disposed substantially opposite the ramp portion of the seat being encased by the lead shroud;
    said stud having an electrical resistivity substantially less than the resistivity of the lead of the shroud;
    said shroud separately, and prior to forming the hereafter described seal, having an outer dimension greater than the inner dimension of the seat by at least about one percent, and the lead or lead alloy of the shroud having a Brinell hardness of less than about 10 kg/mm²;
    means associated with the stud for facilitating pressing the inclined surface portion of the shroud against the inclined ramp portion of the seat to form an interference fit therebetween and thereby establish a liquid-tight seal between the connector and resilient partition.

2. The sealed through connector of claim 1 wherein at least a portion of the surface portion of the shroud is characterized by an inverted frustro-conical shape.

3. The sealed through connector of claim 1 wherein the stud has an upper portion extending through the bore and outside the partition for external connection, and a body portion connected to the upper portion, and wherein the connector further comprises extension means protruding from the body portion, both of said body portion and extension means encased in the lead shroud.

4. The sealed through connector of claim 3 wherein the extension means has a resistivity less than about one-fifth the resistivity of the lead of the shroud.

5. The sealed through connector of claim 3 wherein the extension means is in the form of an elongated leg firmly held in intimate connection with the body portion of the stud to provide a low impedance current path therebetween.

6. The sealed through connector of claim 3 wherein the upper portion extending through the bore is provided with thread means, and said pressing means includes nut means engaging said threads and tightened to cause said resilient partition in the region of the seat, and the deformable lead, in the region of the seat where the inclined ramp portion meets the shroud portion, to cold flow together to form intimate liquid-sealing mutual contact.

7. The sealed through connector of claim 1 wherein the stud has a shoulder portion embedded in the lead shroud and such stud has a hardness greater than that of the lead of the shroud.

8. The sealed through connector of claim 1 wherein the inclined ramp forms an angle with the axis of the bore which is at least 5°.

9. In a sealed lead-acid electrochemical cell having at least one positive plate and at least one negative plate, the improvement comprising the sealed through connector of claim 1 connecting one of said plates through the partition to a terminal of the cell.

10. A sealed through connector for conducting electrical current from an electrolytic device through a substantially electrically nonconductive resilient partition, comprising:
   at least one connector seat having a through bore and contained within said resilient partition;
   a connector post insert positioned within the seat and extending through the bore, the insert comprising a stud of electrically conductive material having an upper portion extending through the bore and outside the partition, and a body portion connected to the upper portion and disposed within the seat, and extension means protruding from the body portion, and a deformable lead or lead alloy shroud covering the exterior of said body portion of the stud and the extension means;
   said stud and said extension means each having an electrical resistivity substantially less than the resistivity of the lead of the shroud; and
   means associated with the stud for facilitating deforming the lead shroud against the seat to thereby establish a liquid tight seal between the connector and the resilient partition.

11. The sealed through connector of claim 10 wherein the extension means has a resistivity less than about one-fifth the resistivity of the lead of the shroud.

12. The sealed through connector of claim 11 wherein the extension means is in the form of an elongated substantially right-angularly projecting leg firmly held in intimate connection with the body portion of the stud to provide a low impedance current path for the connector.

13. The sealed through connector of claim 10 wherein the lead shroud surrounding the extension means is of sufficient thickness to provide a corrosion layer of lead and permit joining the lead enshrouded extension means to a lead-based electrode plate or extension thereof.

14. The sealed through connector of claim 10 wherein the upper portion of the stud extending through the bore is provided with thread means, and said pressing means includes cooperating thread means engaging said thread means on the stud and tightened to provide liquid-sealing mutual contact between the deformable lead of the shroud and the resilient partition seat.

15. The sealed through connector of claim 10 wherein the stud and extension means are integrally formed of a single piece of material which is harder than the lead of the shroud.

16. An insert for conducting electrical current from an electrolytic device through a polymeric electrically nonconductive partition, comprising:
   a stud of electrically conductive material having an upper portion adapted to extend through a bore in the partition, and a body portion connected to the upper portion, the body portion terminating in an enlarged shoulder which has a greater lateral dimension than the body portion;
   extension means intimately attached to and protruding from the body portion; and
   a deformable lead or lead alloy shroud fully surrounding and encasing in intimate contact said extension means, and body portion of the stud.

17. The insert of claim 16 wherein said extension means is in the form of an elongated substantially right-angularly projecting leg firmly held in intimate connection with the body portion of the stud to provide a low impedance current path.

18. The insert of claim 16 wherein both of said stud and extension means are formed individually of materials which have a resistivity less than about one-fifth the resistivity of the lead of the shroud.

19. The insert of claim 18 wherein said stud and extension means each bear a coating compatible therewith and compatible with the lead shroud, said coating forming a bond between and being mutually miscible with each of the stud and lead shroud.

20. The insert of claim 19 wherein the lead shroud has a Brinell hardness of less than about 10 kg/mm², and the stud and extension means having a Brinell hardness greater than that of the lead shroud.

21. In a normally sealed lead-acid electrochemical cell, an improved sealed through connection for conducting electrical current from the electrodes through a resilient plastic partition to the terminals of the cell, comprising:
   at least one connector having a through bore and contained within said resilient partition, the seat comprising a shoulder portion interposed between a reduced neck portion and an inclined ramp portion;
   a connector post inserted position within the seat and extending through the bore, the insert comprising:
   a stud of electrically conductive material having an upper threaded portion extending through the bore and outside the partition, and a body portion connected to the upper portion terminating in an enlarged tapered shoulder surface inclined in the general direction of the inclined ramp;
   extension leg means protruding laterally from the body portion of the stud and composed of an electrically conductive material firmly held in intimate connection with the body portion of the stud; and
   a deformable relatively soft lead or lead alloy shroud having a Brinell hardness of less than about 10 kg/mm² and fully encasing said body portion of the stud and said extension leg means, said shroud having an inclined surface portion for disposition and engagement within the seat and the encased extension leg means defining a lug extension for connection with the electrodes;

said stud and said extension leg means each having an electrical resistivity less than about one-half the resistivity of the lead of the shroud;

said shroud separately having an outer dimension greater than the inner dimension of the seat; and nut means associated with the treaded stud for facilitating pressing the inclined surface portion of the shroud against the inclined ramp portion of the seat to form an interference fit therebetween and thereby establish a liquid tight seal between the connector and resilient partition actuated solely from one side of the partition.

22. The sealed through connector of claim 1 wherein the stud has a body portion which terminates in an enlarged shoulder which is tapered and which has a greater lateral dimension than the body portion, the inclination of the taper of the enlarged shoulder being generally parallel to the inclination of the inclined ramp portion of the seat.

23. The sealed through connector of claim 3 wherein the extension means together with its encasing lead shroud define a lug connector for making connection with an electrode of the electrolytic device, and wherein the lead shroud of said lug has a reduced porosity as compared with a lug using the same lead material but without such extension means being embedded within the lug.

* * * * *

UNITED STATES PATENT OFFICE
CERTIFICATE OF CORRECTION

PATENT NO. : 3,964,934
DATED : June 22, 1976
INVENTOR(S) : Larry K. W. Ching, Jr., et al It is certified that error appears in the above-identified patent and that said Letters Patent are hereby corrected as shown below:

Title page, Inventors, after "Lakewood," insert -- Toshio Uba, Denver, all --.

Title page, Inventors, after "Lakewood" delete "both."

Column 8, line 48, "inserted position" should read -- insert positioned --.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*